(12) United States Patent
Yamaguchi

(10) Patent No.: US 8,731,112 B2
(45) Date of Patent: May 20, 2014

(54) TONE SIGNAL CIRCUIT AND WIRELESS RECEIVER

(75) Inventor: Kouichiro Yamaguchi, Osaka (JP)

(73) Assignee: Icom Incorporated (JP)

( * ) Notice: Subject to any disclaimer, the term of this patent is extended or adjusted under 35 U.S.C. 154(b) by 113 days.

(21) Appl. No.: 13/240,192

(22) Filed: Sep. 22, 2011

(65) Prior Publication Data
US 2012/0093264 A1  Apr. 19, 2012

(30) Foreign Application Priority Data

Oct. 19, 2010  (JP) .................................. 2010-234614

(51) Int. Cl.
*H04L 27/06* (2006.01)
(52) U.S. Cl.
USPC .......................................... 375/340; 375/295
(58) Field of Classification Search
USPC .................................. 375/340, 295
See application file for complete search history.

(56) References Cited

U.S. PATENT DOCUMENTS

| | | | | |
|---|---|---|---|---|
| 5,392,348 | A * | 2/1995 | Park et al. ...................... | 379/386 |
| 6,668,057 | B1 * | 12/2003 | Otsuka et al. .................. | 379/283 |
| 6,950,511 | B2 | 9/2005 | Das et al. | |
| 2002/0076034 | A1 * | 6/2002 | Prabhu et al. ............ | 379/390.02 |
| 2003/0123574 | A1 * | 7/2003 | Simeon et al. ................. | 375/340 |
| 2005/0105716 | A1 * | 5/2005 | Das et al. .................. | 379/376.02 |
| 2005/0195967 | A1 * | 9/2005 | Pessoa et al. .................. | 379/283 |
| 2006/0098806 | A1 * | 5/2006 | Schulz ...................... | 379/395.01 |
| 2007/0265791 | A1 * | 11/2007 | Valadon .......................... | 702/76 |
| 2010/0086140 | A1 * | 4/2010 | Chen et al. ...................... | 381/56 |
| 2011/0103573 | A1 * | 5/2011 | Susan ...................... | 379/395.01 |
| 2011/0200120 | A1 * | 8/2011 | Lareau et al. ............ | 375/240.26 |

OTHER PUBLICATIONS

"Modified Goertzel Algorithm in DTMF Detection Using the TMS320C80" Application Report SPRA066, Chiouguey J. Chen, 1996 Texas Instruments.
"The sliding DFT", Eric Jacobsen and Richard Lyons, IEEE Signal Processing Magazine, Mar. 2003, pp. 74-79.

* cited by examiner

*Primary Examiner* — Daniel Washburn
*Assistant Examiner* — Berhanu Tadese
(74) *Attorney, Agent, or Firm* — Gerald E. Hespos; Michael J. Porco; Matthew T. Hespos

(57) ABSTRACT

In a tone signal circuit and a wireless receiver of the present invention, a digital signal in a frequency band including at least a tone signal component is input into a Goertzel filter. Further, an envelope of an output from the Goertzel filter is detected, and a derivative value of the envelope is derived. Then, if the derivative value is maintained to be equal to or greater than a first threshold value, it is determined that a first prerequisite for existence of the tone signal component is satisfied. The above tone signal circuit and the wireless receiver can perform highly-accurate tone detection in a small calculation amount.

9 Claims, 8 Drawing Sheets

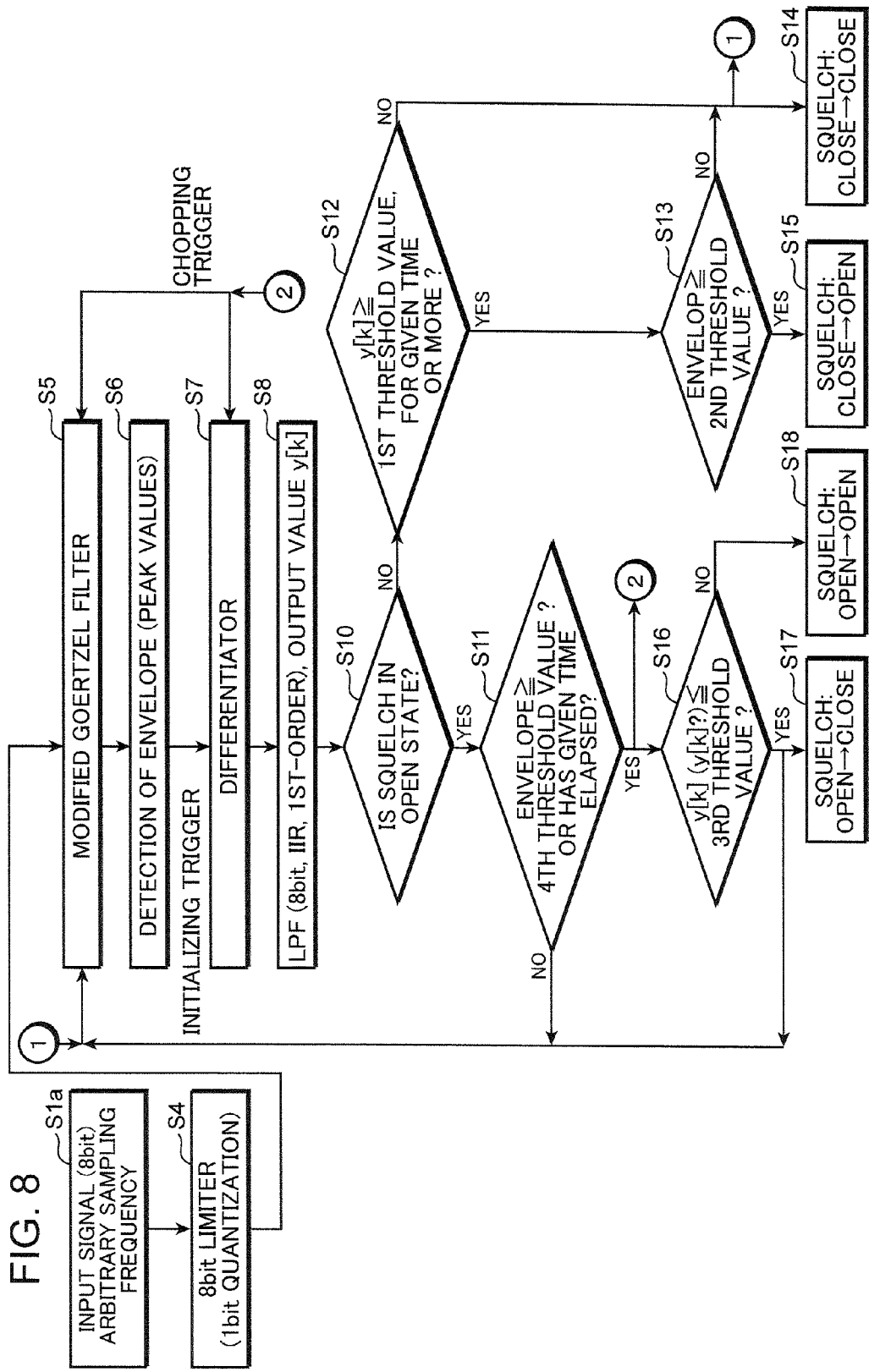

TONE SIGNAL CIRCUIT AND WIRELESS RECEIVER

BACKGROUND OF THE INVENTTION

1. Field of the Invention

The present invention relates to a tone signal circuit for use in a device requiring tone detection, such as a circuit for realizing a tone squelch function, and a tone signal detection algorithm. The present invention also relates to a wireless receiver using the tone signal circuit or the tone signal detection algorithm.

2. Description of the Related Art

In analog wireless communications, a signal modulated by a sine wave having a specific frequency, in a range of 0 to 300 Hz outside a telephone voice frequency band (the signal will hereinafter be referred to as "tone modulated signal") is generally used for identification of a transmitter or a receiver, etc. For example, in the United States, a communication scheme using the tone modulated signal is specified in TIA/EIA-603 (the scheme will hereinafter be referred to as "CTCSS"). An analog wireless communication unit currently used commonly has a so-called tone squelch function of accurately detecting by which of 51 types of tone frequencies a received CTCSS tone modulated signal is modulated, within 250 msec from start of receiving the tone modulated signal, and, if the detected tone frequency corresponds to a radio channel which is permitted to be received, enabling an output of audio signals (opening squelch), or, if the detected tone frequency corresponds to a radio channel which is not permitted to be received, disabling the audio output (closing the squelch). The TIA/EIA-603 further specifies a tone termination stop signal for directing stop of audio output (closing of opened squelch). The wireless communication unit accordingly has a function of, upon receiving the tone termination signal, immediately closing the squelch, i.e., stopping the audio output.

Nowadays, in a wireless communication unit, generally, a demodulated signal in a receiver is often digitized after being filtered by an anti-aliasing low-pass filter, and the obtained digital demodulated signal is subjected to a digital signal processing. In this way, the above tone squelch function is realized in the digital domain. For the digital signal processing, a microcontroller (hereinafter referred to as "MPU"), a digital signal processor (hereinafter referred to as "DSP"), a dedicated digital logic circuit, etc., are used. In these circuits, as frequency resolution in an algorithm for tone frequency detection becomes worse, it often becomes necessary to use a wider bit width computation. Further, as the algorithm becomes complex, it becomes necessary either to use a high-performance processor capable of computing at a high speed or to permit a longer calculation time. These undesirably lead to increases in cost and required power consumption of a digital circuit block necessary for the tone frequency detection, which is disadvantageous, particularly, for mobile wireless units.

The present invention is intended for a processing for the tone squelch and a processing for detecting a tone frequency of a sinusoidal signal. In the present invention, for example, features of the A/D conversion and any analog processing preceding the A/D conversion, and how to use an output tone signal, are not particularly limited. As an example of simple means for detecting a specific frequency component in an input signal, i.e., detecting a tone signal, three conventional techniques will be described below. To realize the tone signal detection, it is necessary to determine whether a tone signal having a specific known target frequency $f_T$ exists in an input signal s(t).

A first conventional technique is a typical methodology. In the first conventional technique, the input signal s(t) is introduced into a band-pass filter (hereinafter referred to as "BPF") having a pass-band center frequency set to $f_T$, and power ratio of an filtered output signal to the input signal s(t) are examined. Then, in the first conventional technique, as a result of the examination, if the power of the output signal has a significant magnitude as compared to the power of the input signal s(t), it is determined that the tone signal exists. On the other hand, if the power of the output signal is sufficiently small as compared to the power of the input signal s(t), it is determined that the tone signal does not exist.

However, in a low-cost digital signal processing circuit, such a BPF is generally implemented as an infinite impulse response (hereinafter referred to as "IIR") filter. In cases where the IIR BPF is realized by an 8-bit fixed-point operation with a view to reductions in power consumption and cost, the following problems will occur. Firstly, for filter operation, power calculation, etc., it is necessary to perform a multiplication operation at least two or three times with respect to each sampling. Thus, in an 8-bit MPU having no multiplier, a computational load becomes heavier. Further, in order to allow the BPF to have a sufficient Q value, it is generally necessary to represent numerical values using a bit length of longer than 8 bits. Secondly, in cases where an analytical transfer function of BPF is approximately represented by an 8-bit fixed-point IIR formula, a quantization error becomes larger, and a peak center of a filter characteristic of an approximate BPF often appears at a position deviating with respect to a correct value, i.e., the target frequency $f_T$. In the tone squelch, it is necessary to detect tone frequencies, with an error, for example, of 2% or less. Therefore, in order to avoid an erroneous determination, it is necessary to adjust the peak center of the BPF to the target tone frequency, often accompanying deterioration of the Q value as a side effect. As above, in the first conventional technique using a BPF, it is highly likely that the computational load becomes heavier, and the peak center becomes inaccurate, which gives rise to a need for a higher-speed MPU having a longer bit length, and causes an increase in power consumption required for calculation.

In a second conventional technique, the input signal s(t) is mapped to the frequency domain by fast Fourier transformation (hereinafter referred to as "FFT"), and it is determined whether a signal component at the target frequency $f_T$ has a sufficient magnitude as compared to a power of the input signal s(t). In this way, a tone signal is detected. However, the FFT requires a plurality of times of multiplication operations and addition operations, and a buffer for handling a large number of discrete frequencies, which poses a problem of a large computational load.

Therefore, in 1958, Gerald Goertzel invented a modified methodology (so-called Goertzel algorithm) designed to subject only a signal component having a specific frequency to discrete Fourier transformation (hereinafter referred to as "DFT") so as to reduce a computational load and cut down an amount of required calculation buffer. In the Goertzel algorithm, an IIR BPF represented by the following transfer function G(z) and having an infinite Q is employed (the IIR BPF will hereinafter be referred to as "Goertzel filter").

$$G(z) = \frac{1 - e^{j\theta}z^{-1}}{1 - (2\cos\theta)z^{-1} + z^{-2}} \quad (1)$$

where $$\theta = \frac{2\pi k}{N},$$

$$k = \left\lfloor \frac{1}{2} + \frac{Nf_T}{f_S} \right\rfloor$$

In the Formula 1, $f_T$, fs and N are a target frequency (resonant frequency), a sampling frequency and the number of sampling points, respectively. Differently from the BPF described in the first conventional technique, the Goertzel filter is not a so-called stable filter.

An output of the Formula 1 is a complex signal. In the Goertzel algorithm, an input signal having a finite time length represented by continuous N sampled data is introduced into the Goertzel filter represented by the Formula 1, and a norm of an output complex signal obtained at the N-th last sampling point is calculated. In this way, a power of a Fourier component at the target frequency $f_T$ in the input signal is estimated. Thus, a simplified filter represented by the following Formula 2 is used for the remaining sampling points other than the last sampling point, so that it becomes possible to cut down the calculation amount. As with the FFT, the Goertzel algorithm is capable of reducing a spectral leakage by means of a window function, according to need. Further, in the Goertzel algorithm, the peak center of the Goertzel filter can be accurately adjusted to the target frequency $f_T$ to enhance detection accuracy, by setting N and fs to allow $N \cdot f_T/f_S$ to become an integer.

$$Q(z) = \frac{1}{1 - (2\cos\theta)z^{-1} + z^{-2}} \quad (2)$$

Therefore, in the second conventional technique using the Goertzel algorithm, the second problem in the strategy using the BPF is solved, so that the tone detection can be performed with sufficient accuracy even by the 8-bit fixed-point operation. In addition, at each of the remaining sampling points other than the last sampling point, an output value is obtained by using the Formula 2-type filter and performing a multiplication operation by 2 cos θ, only once. Thus, the first problem in the first conventional technique is significantly relieved. The Goertzel algorithm is a methodology suited to detection for a small number of tone signals, as described above, and applied, for example, to detection of a DTMF signal (see, for example, Document 1: "Modified Goertzel Algorithm in DTMF Detection Using the TMS320C80" Application Report SPRA066, Chiouguey J. Chen, 1996 Texas Instruments; a Modified Goertzel Algorithm described in the Document 1 is totally different from an aftermentioned Modified Goertzel filter in this specification).

However, the second conventional technique using the Goertzel algorithm has the following problems. Firstly, the Goertzel algorithm is configured such that, as for an input signal having a certain finite time length and the number N of sampling points, a result is obtained at a timing of the last N-th sampling point, by calculating a power of complex frequency component values in a DFT bin corresponding to the target frequency $f_T$ (i.e., a power in a certain bandwidth Δf having a center at $f_T$). Thus, the Goertzel algorithm configured to perform the power calculation only at the last sampling point is incapable of responding to an accidental change in the input signal during intermediate sampling points without a long delay, and continuously observing an input signal state. In the tone squelch, it is required to quickly detect start of a tone signal (transition from noise to a tone signal) and stop of the tone signal. However, if the coefficients of the Goertzel algorithm are adjusted to cope with an input signal of finite length, for example, of 250 msec, a detection result is obtained only at every interval of 250 msec, which fails to meet required specifications concerning high-speed response.

Secondly, an output value to be obtained by the Goertzel algorithm is proportional to an energy value to be obtained by integrating respective powers of frequency components at the target frequency $f_T$ in an input signal, during a sampling period $N/f_S$. Thus, in cases where an input tone signal has a large power, or a sampling period N is set to a large value, the energy value becomes extremely large to cause overflow of the output value. This becomes a problem when the Goertzel algorithm is applied to the tone squelch which requires continuously observing a demodulated signal for a long period of time.

Thirdly, it is necessary to perform a multiplication operation for the Formula 2 once at each sampling point, and then perform a multiplication operation for the power calculation at the last sampling point three times. This computational load is still not low enough for the 8-bit MPU having no multiplier.

As a methodology for solving the first and second problems in the second conventional technique, there has been known a strategy disclosed in Document 2: U.S. Pat. No. 6,950,511, and Document 3: U.S. Patent Publication No. 2005/0105716 which would be an improvement of the Document 2. As described in the patents by S. Das and M. McShea, this strategy is designed to shift a start timing of a sampling window for use in extracting a target signal frame having a finite time length, from a continuous input signal, while allowing it to overlap with preceding and subsequent signal frames, so as to perform a pipeline processing, to substantially shorten a detection interval (see, for example, FIG. 6 in the Document 3). However, in the pipeline processing, a required computational load is increased multiply due to the overlapping. Further, if it is attempted to sufficiently shorten the detection interval, the number of required pipelines will be significantly increased. For example, in cases where a plurality of sampling windows each having a length of 260 msec are overlapped with each other so as to detect a tone signal at intervals of 20 msec, thirteen pipelines are required, so that the computational load becomes significantly heavier.

As another methodology for solving the second problem in the second conventional technique, there has been known a technique designed to stabilize the Goertzel filter, wherein each of the coefficients of the Formulas 1 and 2 is multiplied by a damping factor, in such a manner that poles of each of the G(z) and Q(z) are relocated inside a unit circle centered at the origin of the complex plane so as to prevent output divergence even for an infinitely-continuous tone signal input. However, in this technique, particularly, when the filter coefficients are represented by an 8-bit fixed-point numbers, it becomes difficult to accurately adjust a peak center of the modified Goertzel filter to the target frequency $f_T$, and a Q value of the filter will be deteriorated. Thus, this technique is not suitable for application to the tone squelch which requires distinguishing between tone signals which are very close in frequency (frequency difference in narrowest spacing in CTCSS: about 2 Hz).

In order to avoid the first and second problems in the second conventional technique, a third conventional technique is designed to improve the Goertzel algorithm to allow an operation thereof to be performed on a continuous-time basis. It is referred to as "Sliding Goertzel DFT" (see, for example, Document 4: "The sliding DFT", Eric Jacobsen and Richard Lyons, IEEE Signal Processing Magazine, March 2003, pp. 74-79). In this methodology, at each successive sampling point k, k+1, . . . , a computation of a DFT components at the target frequency $f_T$ of a finite-length input signal frame containing the last N sampled data, x[k−(N−1)], . . . , x[k], and the norm thereof, can be performed with a less computational effort. Specifically, in the Sliding Goertzel DFT, a Sliding Goertzel filter represented by the following transfer function H(z) is employed:

$$H(z) = \frac{(1 - e^{j\theta}z^{-1})(1 - z^{-N})}{1 - (2\cos\theta)z^{-1} + z^{-2}} \quad (3)$$

In the Formula 3, θ and K are defined in the same manner as that in the Formula 1, and $f_T$, $f_S$ and N are a target frequency (resonant frequency), a sampling frequency and the number of sampling points, respectively.

In other words, the Formula 3 represents a filter in which an N-delay comb filter is added in a preceding stage of the Formula 1. In this case, when an input signal having continuous N or more sampling points is introduced into the Sliding Goertzel filter, an output y[k] at and after the N-th sampling point becomes equal to DFT components at the target frequency $f_T$ in a finite-length input signal x[k−(N−1)], . . . , x[k]. As can be understood from the Formula 3, the Sliding Goertzel DFT is an excellent methodology capable of continuously calculating DFT components concerning the target frequency $f_T$, at a calculation cost less than that in case of executing the Goertzel algorithm at each sampling point.

However, the third conventional technique using the Sliding Goertzel DFT still has the following problems. As is clear from the Formula 3, a frequency characteristic of the Sliding Goertzel filter is represented by a sin c function defined such that the target frequency $f_T$ is set as a center frequency, as with the conventional DFT. This means that, if $f_T/f_S$, i.e., a ratio of the target frequency $f_T$ to the sampling frequency $f_S$, is not sufficiently small, a Q value of the filter will be deteriorated. Thus, a first problem is that, in cases where the Sliding Goertzel DFT is applied to the tone squelch which requires performing the tone detection with high frequency resolution (e.g., 2 Hz, as mentioned above), by low power consumption, i.e., at low sampling frequencies, it becomes difficult to meet requirements for noise immunity and frequency resolution. In contrast, the Goertzel filter as the second conventional technique has a feature that a Q value thereof is significantly high, as mentioned above. A second problem is as follows. Differently from the Goertzel filter, it is necessary to perform calculation of the numerator in the Formula 3 at each sampling point, so that the computational load becomes heavier than the Goertzel filter, although there is an advantage of being able to continuously obtain an output.

SUMMARY OF THE INVENTION

In view of the above circumstances, it is an object of the present invention to provide a tone detector circuit capable of performing highly-accurate tone detection with a light computational load, and a wireless receiver using the tone detector circuit.

In a tone detector circuit and a wireless receiver of the present invention, a digital signal including at least a tone signal component is input into a Goertzel filter. Then, an envelope of an output from the Goertzel filter is detected, and a derivative of the envelope is derived. Then, if the derivative is maintained to be equal to or greater than a first threshold value, it is determined that a first prerequisite for existence of the tone signal component is satisfied. Thus, the above tone detector circuit and the wireless receiver can perform highly-accurate tone detection with a light computational load.

These and other objects, features and advantages of the present invention will become more apparent upon reading the following detailed description along with the accompanying drawings.

BRIEF DESCRIPTION OF THE DRAWINGS

FIG. 8 is a flowchart illustrating a squelch determination algorithm in a tone squelch circuit according to another embodiment of the present invention.

DETAILED DESCRIPTION OF THE PREFERRED EMBODIMENTS

Figure 1:
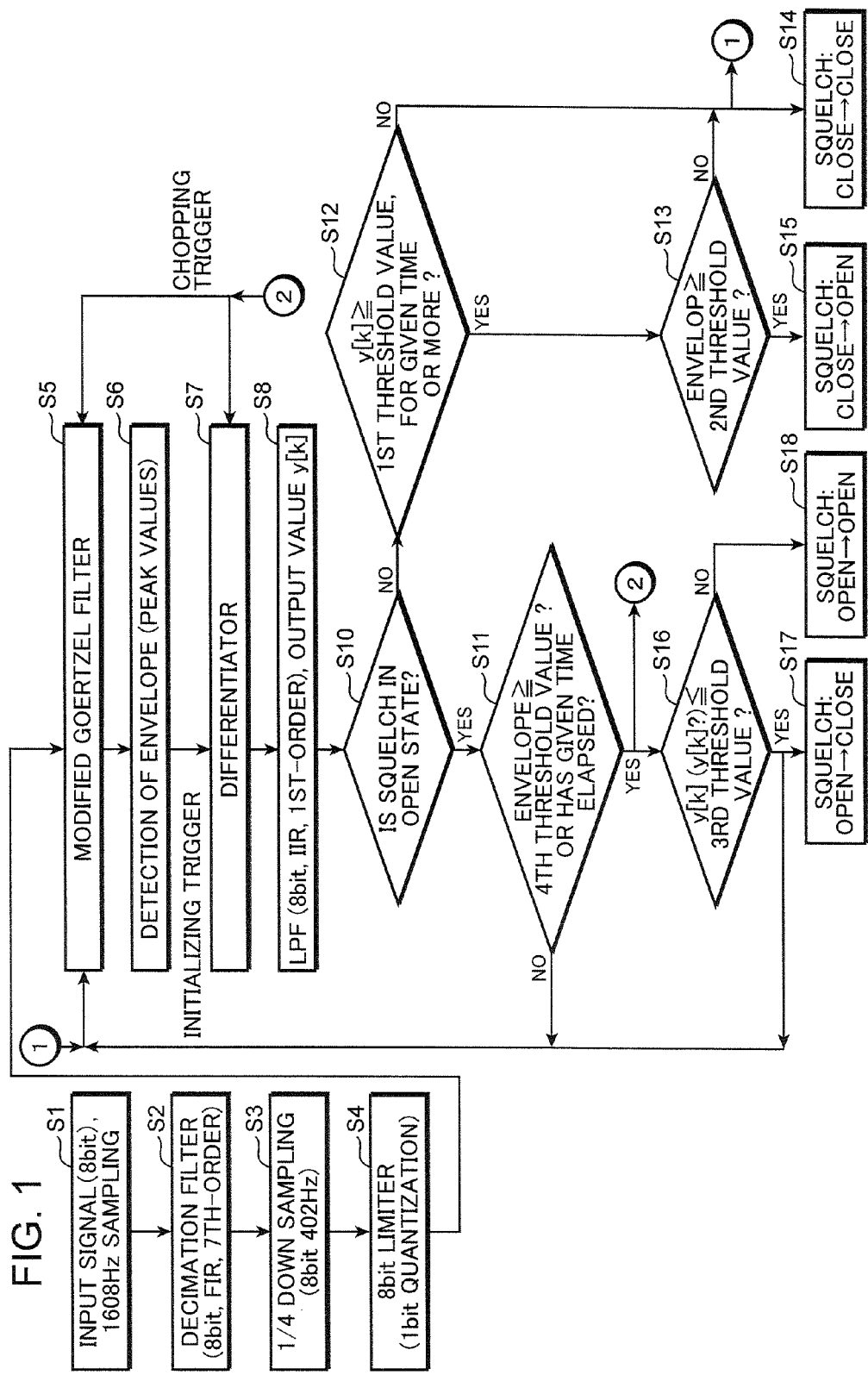
FIG. 1 is a flowchart illustrating a squelch determination algorithm in a tone squelch circuit according to one embodiment of the present invention.

With reference to the drawings, the present invention will now be described based on an embodiment thereof. In the figures, it is meant that two or more elements designated by a common reference numeral or code are the same elements, and a duplicated description thereof will be omitted on a case-by-case basis. Further, in this specification, a generic or collective element is indicated by a reference numeral or code without a suffix, and an individual element is indicated by a reference numeral or code with a suffix.

(First Embodiment)

FIG. 1 is a flowchart illustrating a squelch determination algorithm in a tone squelch determination circuit according to a first embodiment of the present invention. In FIG. 1, specific values of a filter order and a sampling frequency are shown as an example on an assumption that a target frequency $f_T$ is set to 67 Hz. At the frequency 67 Hz, a tone spacing from an adjacent one of tone frequencies specified in the CTCSS becomes narrowest, which leads to difficulty in tone detection. In a tone frequency of 67 Hz, a closest tone frequency is 69.3 Hz. Thus, as a standard level in this field, it is required to have a capability of detecting the tone signal within 250 msec from start of receiving the tone signal, with a frequency resolution of about 2 Hz or less. On the other hand, according to the specifications of the CTCSS, as the tone frequency becomes higher, the spacing between the tone signals becomes wider, so that it becomes easier to perform the tone detection. For example, as for a tone signal of 203.5 Hz, an adjacent tone is spaced apart therefrom by about 10 Hz. Thus, the tone detection can be more easily performed as compared to the tone signal at 67 Hz.

In cases where the algorithm in FIG. 1 is used for another target frequency other than 67 Hz, a sampling frequency of a Modified Goertzel filter, a sampling frequency of an A/D converter, an order of a Decimation filter, and a filter constant of a low-pass filter, are changed depending on target frequencies $f_T$, as described later.

Before describing the actual algorithm in FIG. 1, a basic concept will be described below. The circuit according to the first embodiment is designed to perform tone detection from a digital demodulated signal through a digital signal processing, while maximally reducing a computational load. Further, the circuit according to the first embodiment is fundamentally configured using a resonator section of the Goertzel filter represented by the Formula 2.

An output signal q[n] to be obtained by inputting, into the Goertzel filter represented by the Formula 2, a tone signal: $x[n]=\alpha \sin(\theta n)$, having a frequency equal to a resonant frequency $\theta$ thereof, is represented by the following Formula 4:

$$q[n] = \frac{\alpha}{2\sin^2\theta}((n+2)\cos\theta\sin((n+1)\theta) - (n+1)\sin((n+2)\theta)) \quad (4)$$

When n>>1, the Formula 4 is approximated by the following Formula 5:

$$q[n] \cong \frac{\alpha n}{2\sin\theta}\cos((n+1)\theta) \quad (5)$$

Thus, as can be expected from the Formula 5, an envelope of the output signal becomes a function which linearly increases with respect to a sampling time $nT_S$ (where $T_S$ is a sampling period).

Differently, an output signal q[n] to be obtained by inputting, into the Goertzel filter represented by the Formula 2, a tone signal: $x[n]=\alpha \sin(\omega n)$, having a frequency $\omega$ different from the resonant frequency $\theta$, is represented by the following Formula 6:

$$q[n] = \frac{\alpha}{2(\omega-\theta)\sin\theta} \left( \begin{array}{l} (\sin\theta - \sin\omega)\sin\left(\frac{\omega+\theta}{2}(n+1)\right)\cos\left(\frac{\omega+\theta}{2}(n+1)\right) + \\ (\sin\theta + \sin\omega)\cos\left(\frac{\omega+\theta}{2}(n+1)\right)\sin\left(\frac{\omega-\theta}{2}(n+1)\right) \end{array} \right) \quad (6)$$

Thus, as can be expected from the Formula 6, the output signal is oscillated at a frequency of $(\omega+\theta)/2$. Further, an envelope of the output is oscillated at a frequency of $(\omega-\theta)/2$ (i.e., an absolute value of the envelope is oscillated at a frequency of $\omega-\theta$), and an amplitude of the oscillation is inversely proportional to the frequency deviation $\omega-\theta$.

Therefore, as can be expected from the Formulas 5 and 6, the frequency deviation $\omega-\theta$, i.e., a difference between a frequency $\omega$ ($=f_1$) of a tone signal to be input into the Goertzel filter, and a target frequency $\theta$ ($=f_T$), can be estimated by observing a derivative and an amplitude of an envelope of an output signal from the Goertzel filter. Based on this inventor's knowledge, an aftermentioned tone squelch determination algorithm is configured.

Figure 2:
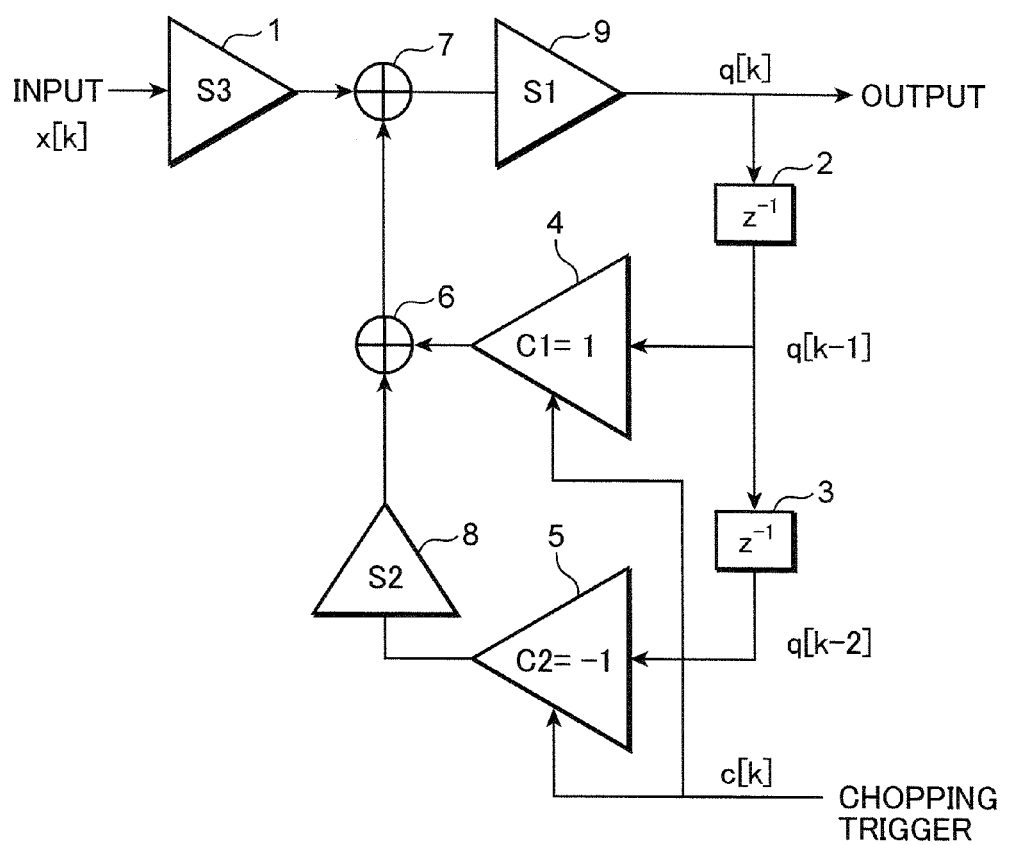
FIG. 2 is a block diagram illustrating a functional configuration of a Modified Goertzel filter used as a Goertzel filter.

FIG. 2 illustrates a functional configuration of a Modified Goertzel filter used as the Goertzel filter in the first embodiment. The block configuration in FIG. 2 schematically illustrates an algorithm configured by modifying the resonator section of the basic Goertzel filter (corresponding to the Formula 2) based on the inventor's knowledge. However, the filter processing algorithm in the first embodiment cannot be explicitly explained only by the functional block illustrated in FIG. 2. The visually unexplainable part will be defined by a mathematical formula, later.

The Modified Goertzel filter in FIG. 2 is configured to comprise: a buffer 1 adapted to appropriately subject an input signal x[k] to sign inversion; two-stage delay buffers 2, 3 each adapted to delay its input signal by one sampling period; two buffers 4, 5 each adapted to multiply an output of a corresponding one of the delay buffers 2, 3 by a respective one of two coefficients of 1 and −1; a buffer 8 interposed on an input or output side (in FIG. 2, on an output side) of the buffer 5; an adder 6 adapted to add respective outputs of the buffers 4, 8; an adder 7 adapted to add an output of the adder 6 to an output of the buffer 1; and a buffer 9 interposed on an output side of the adder 7 and adapted to send out the output signal q[k]. In this case, the buffer 4 and the buffer 5 function as a sign non-inverting buffer and a sign inverting buffer, respectively. An output of the delay buffer 2 is delayed with respect to the output signal q[k] by one sampling period (q[k−1]), and an output of the delay buffer 3 is delayed with respect to the output signal q[k] by two sampling periods (q[k−2]). A major modification is that the buffers 1, 4, 5 are added to the basic Modified Goertzel filter, and each of the buffers 4, 5 has a function of allowing scaling (chopping) of a latched status variable at a given ratio.

The modifications based on the inventor's knowledge will be more specifically described. A first feature is that, assuming $\theta=2\pi f$, wherein a specific rational number $f=f_T/f_S$ such that could allow $\cos\theta$ to become a rational number is utilized to reduce the computational load. Within a Nyquist frequency range of f[0, 1/2], f meeting the above requirement is limited only to {0, 1/6, 1/3, 1/2}. Among them, the 0 means that the sampling frequency $f_S$ is set to an infinite value, and the 1/2 means that the target frequency $f_T$ is set to a Nyquist frequency (see the Formula 1). Thus, only the 1/6 or 1/3 is a useful ratio of $f_T/f_S$. In the two ratios, it is preferable to set the ratio to 1/6, in view of easing requirements of aliasing filter. For this reason, in FIG. 1, $f_S$ is set to $6f_T$ (67 Hz×6=402 Hz), and the number N of sampling points is set to of a multiple of 6. In this case, $\cos\theta=1/2$, and the Formula 2 is expressed as the following Formula 7 which represents a simple transfer function having only integer coefficients.

$$Q(z) = \frac{1}{1-z^{-1}+z^{-2}} \quad (7)$$

Thus, filter coefficients of the buffers 4, 5 in FIG. 2 are C1=1 and C2=−1, respectively. Otherwise, if the ratio is set to 1/3, $\cos\theta=-1/2$, and the filter coefficients are C1=−1 and C2=−1, respectively.

As above, based on the first feature, the Modified Goertzel filter in the first embodiment is capable of calculating an output value only by an addition operation without a need for a multiplication operation. This makes it possible to execute a filtering processing at a high speed and with low power consumption even using an 8-bit MPU having no multiplier. Even in cases where the above Modified Goertzel filter is implemented for the 8-bit MPU, the addition operation can be performed at 16-bit accuracy, and a filter output is generated as 16-bit fixed-point values. Further, based on using the Formula 7-type filter, a quantization error of the filter can be suppressed to 0 (zero), irrespective of a bit width for use in a fixed-point operation. Thus, even if coarse representation using an 8-bit fixed-point number is used, the Modified Goertzel filter in the first embodiment almost never causes an addition of quantization noise.

A second feature is that, according to need, sign inversion is performed to allow the filter output q[k] to constantly have a non-negative value. A third feature is that output chopping is performed to keep a filter output value from overflowing. It is difficult to sufficiently explain the second and third features only by the block diagram in FIG. 2. Thus, the explanation will be made using the following Formulas.

The Modified Goertzel filter used in FIG. 1 can be expressed in the following Formula 8, where an input signal and an output signal are x[k], and q[k], respectively, wherein k is an integer variable indicative of a number of a sampling point.

$$q[k]=S_1[k](C_1[k]q[k-1]+S_2[k]C_2[k]q[k-2]+S_3[k]x[k]) \quad (8)$$

In the Formula 8, the coefficients C1, C2 of the buffers 4, 5 are defined by the following Formula 9, according to a value of the chopping trigger input signal c[k] which can take only a logical value 0 or 1.

$$C_1[k] = \begin{cases} 1, & \text{for } c[k] = 0 \\ \frac{1}{2}, & \text{for } c[k] = 1, \end{cases}$$

$$C_2[k] = \begin{cases} -1, & \text{for } c[k] = 0 \\ -\frac{1}{2}, & \text{for } c[k] = 1 \end{cases} \quad (9)$$

Each of the coefficients C1, C2 corresponds to a gain of a respective one of the buffers 4, 5 in FIG. 2. Numerical values in the right-hand side of the Formula 9 is based on an assumption that cos θ=−1/2, and a scaling ratio by the chopping is set to 1/2. On any other condition, the coefficients C1, C2 of the buffers 4, 5 can be defined in the same manner.

Further, each of a coefficient S1 of the buffer 9 and a coefficient S2 of the buffer 8 is a sign-inverting variable having only −1 or 1. The coefficient S1 is defined by the following Formula 10.

$$S_1[k]=sgn[C_1[k]q[k-1]+S_2[k]C_2[k]q[k-2]+S_3[k]x[k]] \quad (10)$$

In the Formula 10, sgn is a sign function, wherein sgn[x]=1 when x is equal to or greater than 0, and sgn[x]=−1 when x is a negative value. In other words, q[k] provides a positive value in any case. Further, the coefficient S2 is defined by the following Formula 11.

$$S_2[k+1]=S_1[k] \quad (11)$$

A coefficient S3 of the buffer 1 is a variable having an initial value of 1, and defined by the following Formula 12 depending on a value of the coefficient S1.

$$S_3[k+1]=sgn[S_1[k]]S_3[k] \quad (12)$$

The Modified Goertzel filter defined by the Formula 8 is configured to perform sign inversion of the filter output q[k] using the coefficient S1 of the buffer 9 so as to allow the filter output q[k] to constantly have a non-negative value, and perform sign inversion of a state variable and an input variable using the coefficients S2, S3 of the buffers 8, 1 so as to allow a negative-polarity waveform of the filter output q[k] to be folded onto a positive-polarity waveform of the filter output q[k] in a smooth and continuous manner. Based on the above sign inversion operations, the Modified Goertzel filter can narrow a maximum value or peak interval of the filter output q[k] by ½ comparing with the conventional Goertzel filter represented by the Formula 2, so as to facilitate smoothening an envelope of an output signal to reduce noise contaminating a differential value of the envelope. Further, according to need, unsigned binary numbers may be used for filter calculation (operation). In this case, a filter-output-value representable range is set to unsigned 16-bit values [0, 65535], instead of signed 16-bit values [−32768, 32767], to allow a dynamic range of the envelope of the output signal to be expanded from [0, 32767] to [0, 65535]. Furthermore, the output chopping is performed using the coefficients C1, C2 of the buffers 4, 5 to keep the filter output value from overflowing. In this case, an overflow suppression control may be performed by asserting a chopping trigger at an appropriate timing.

Based on performing the output chopping in the above manner, it becomes possible to observe an envelope of an output value of the Modified Goertzel filter without overflow. For example, an perpetually linearly increasing envelope of a signal output from the Modified Goertzel filter corresponding to the Formula 5, is transformed into a sawtooth shape by the chopping operation. However, in an operation of differentiating the envelope of the output signal, it is easy to prevent a derivative from becoming discontinuous due to the chopping, as described later. Thus, even if the overflow suppression control based on the chopping is performed, a determination on whether an input tone signal frequency $f_I$ coincides with the target frequency $f_T$ can be continuously performed based on the Formulas 5 and 6 in the following manner, while observing a derivative of an envelope of an output signal from the Modified Goertzel filter in the first embodiment.

Specifically, in a first determination condition, if the derivative of the envelope attenuates to 0 or less within a given period of time after completion of initialization of the Modified Goertzel filter, it is determined that $f_I \neq f_T$. On the other hand, if the derivative is maintained to be equal to or greater than a first positive threshold value for a given period of time, a second determination condition is further applied. In the second determination condition, on an assumption that an amplitude (α in the Formulas 4, 5 and 6) of the input signal x[k] is normalized into a certain constant value by a limiter or the like, if a magnitude of the envelope becomes greater than a certain second threshold value within a given period of time after completion of initialization of the Modified Goertzel filter, it is determined that $f_I = f_T$. If not, it is determined that $f_I \neq F_T$.

In cases where only a noise signal is input into the Modified Goertzel filter, the envelope randomly changes, and thereby a situation where the derivative becomes equal to or less than 0 at a sampling point frequently occurs. When the derivative becomes equal to or less than 0, the Modified Goertzel filter is initialized according to the flowchart in FIG. 1. Moreover, a power spectral density at the target frequency $f_T$ in noise-dominant signal is generally low. Thus, energy accumulated in the target frequency bin, which is proportional to the height of the envelope, for a short period of time from the initialization timing is generally limited to an insignificant amount, and never increases up to a level enough to allow a magnitude of the envelope to become greater than the second threshold value. Thus, there is almost no possibility that an error in the tone signal detection based on the first and second conditions occurs during the noise signal input.

In the tone squelch, it is required to determine an end of a tone signal as quickly as possible, as mentioned above. This can also be realized by observing an envelope of an output value of the Modified Goertzel filter, as described below. Firstly, in an operation of a communication using a tone signal having a certain frequency is terminated, a tone termination signal is generally transmitted. For example, as for the tone termination signal, it is specified that one of (i) a signal obtained by delaying a phase of a tone signal which has been transmitted just before transmission thereof, by π, as soon as an amplitude of the tone signal becomes equal to a center value, i.e., DC value, and (ii) a signal having no tone signal (un-modulated signal), shall be continuously transmitted for 200 msec. In cases where the DC value of the tone signal is 0, the condition (i) may be rewritten as follows: a sign of the tone signal is inverted at a moment of start of transmission of the tone termination stop signal. Further, as unexpected situations, there is a condition (iii) where a receiving signal is suddenly interrupted and only noise is received. A tone squelch determination circuit is required to have a capability of quickly recognizing the termination signal under any of the conditions (i), (ii), (iii). Under the conditions (ii), (iii), upon stop of the tone, a noise signal will be input into the Modified Goertzel filter, so that a situation where the derivative of the envelope has a negative sign at a sampling point frequently occurs, as mentioned above.

An example of stop determination for the tone termination signal to be provided by the technique described in the (i) will be discussed below on an assumption that the tone is stopped at a sampling point M represented by the following Formula 13, without losing generality, and the input signal $x[n]$ is defined by the following Formula 14, where $x_T[n]$ is represented by the following Formula 15.

$$M = \left\lfloor \frac{1}{2} + \frac{2\pi k}{\omega} \right\rfloor \text{ (}k \text{ is an arbitrary natural number)} \quad (13)$$

$$x[n] = \alpha(\sin(\omega n) - 2x_T(n)) \quad (14)$$

$$x_T[n] = \begin{cases} 0, & \text{for } n \leq M \\ \sin(\omega(n-M)), & \text{for } n > M \end{cases} \quad (15)$$

Then, an output signal $q[n]$ to be obtained under a condition that the input signal $x[n]$ defined by the Formula 14 is introduced into the resonator section of the Goertzel filter defined by the Formula 2, when the input tone signal frequency $\omega$ is equal to the resonant frequency $\theta$ of the Modified Goertzel filter, is calculated using the Formula 5, wherein n>>1. As a result, the following Formula 16 is obtained. In other words, the Formula 16 is obtained through the same calculation as that in the Formulas 4 and 5, using the input signal $x[n]$ defined by the Formula 14, differently from the Formulas 4 and 5 where the input signal $x[n]$ is $\alpha \sin(\theta n)$.

$$q[n] = \begin{cases} \frac{\alpha n}{2\sin\theta}\cos((n+1)\theta), & \text{for } n \leq M \\ \frac{\alpha(2M-n)}{2\sin\theta}\cos((n+1)\theta), & \text{for } n > M \end{cases} \quad (16)$$

As can be seen from the Formula 16, a derivative of an envelope of the output signal is changed discontinuously and rapidly from $\alpha/(2 \sin \theta)$ to $-\alpha/(2 \sin \theta)$ before and after the sampling point M. Even in cases where the input tone signal frequency $\omega$ does not accurately coincide with the resonant frequency $\theta$ of the Modified Goertzel filter, the above discontinuous change in the derivative of the envelope of the output signal occurs. Thus, under the condition (i), upon stop of the tone signal, a sharp decline is observed in the derivative of the output envelope. Based on the above facts, the following tone signal termination condition can be set.

Specifically, when a third determination condition is satisfied, i.e., the derivative of the envelope drops to a certain third threshold value or less, it is determined that the tone termination signal is received. Based on the determination, the Modified Goertzel filter is initialized to start a next cycle of the tone detection operation. Simultaneously, it is possible to detect and ascertain whether a tone signal satisfying fI=fT is continuously input by observing whether the differential value of the envelope is maintained to be equal to or greater than the third threshold value.

In the first embodiment, the tone squelch determination algorithm illustrated in FIG. 1 is configured such that opening/closing of the squelch is performed according to the aforementioned first to third criteria. The remaining blocks constituting the flowchart in FIG. 1, other than the Modified Goertzel filter, will be briefly described below.

Firstly, a demodulated signal in a receiver for receiving and demodulating a communication signal is subjected to an analog low-pass filtering processing, as mentioned above.

The receiver is a receiving device (receiving circuit) adapted to receive and demodulate a communication signal. For example, the receiving device (receiving circuit) comprises: an antenna for receiving a radio communication signal; a high-frequency amplifying circuit for amplifying the received communication signal from the antenna; a frequency conversion circuit for converting a frequency of the amplified communication signal from the high-frequency amplifying circuit, into a low frequency; a low-frequency amplifying circuit for amplifying the converted communication signal from the frequency conversion circuit; and a demodulation circuit for demodulating the amplified communication signal from the low-frequency amplifying circuit, and outputting the demodulated signal.

Then, in Step S1, the demodulated signal is converted into a digital signal through an A/D converter to form an input signal for the tone squelch circuit. In this process, with a view of power consumption, it is desirable to set a sampling frequency for use in forming a discrete-time signal to a lower value. However, this means a cutoff frequency of the anti-aliasing analog low-pass filter must be set to a lower value, and a higher order analog low-pass filter having a larger roll-off must be used. Generally, as the analog low-pass filter, a low-order type is frequently used in view of reductions in cost and power consumption, so that the sampling frequency is often forced to set to a high value to some extent. In the example illustrated in FIG. 1, assuming that a frequency component of 804 Hz or more is sufficiently suppressed by the analog low-pass filtering processing, the analog input signal is converted into an 8-bit digital signal at a sampling frequency of 1608 Hz. Thus, the digital signal includes a frequency component existing in a telephone voice frequency band equal to or greater than 300 Hz, i.e., a frequency component other than a tone signal.

On the other hand, in the Modified Goertzel filter for detecting a tone signal having a frequency of 67 Hz, it is necessary to perform sampling at a frequency of 402 Hz which is six times greater than the target frequency. For this reason, in Step S3, the sampling frequency 1608 Hz is down-sampled by ¼, i.e., converted into 402 Hz, through a downsampling circuit. In this process, a decimation filter in Step S2 is required to avoid aliasing caused by a frequency components between 300 Hz and 804 Hz which are folded onto the target frequency. The Modified Goertzel filter itself can be considered as a BPF having a significantly high Q value. Thus, as the decimation filter used in the Step S2, a simple notch filter having notches only at aliasing frequency points may be employed, instead of a commonly-used anti-aliasing low-pass filter having a stopband. In the example illustrated in FIG. 1, in the frequency band of 300 Hz to 804 Hz, a frequency point which is likely to be erroneously detected by the Modified Goertzel filter due to aliasing is 335 (=402−67) Hz, 469 (=402+67) Hz and 737 (=402×2−67) Hz. Thus, the decimation filter may be comprised of a low-order FIR filter, having a notch only at each of the above three points.

Further, coefficients of this FIR filter may be rounded to a simple value close to 2n (n is a natural value), to enable fast multiplication by shift operations. Even in this case, the FIR filter can be used without causing a significant error, in most cases. Because, when a frequency component of a signal represented by an 8-bit fixed-point number attenuates by about $1/100$, i.e. −20 dB, a value of the frequency component of the filter output signal becomes 0 by numerical rounding even if it has a large amplitude, and thereby a sufficient effect as the decimation filter can be obtained as long as the signal is suppressed to some extent at desired notch frequency point. Therefore, generally, the decimation filtering processing can be achieved by several shift and add operations having a low computational load, without a need for performing a multiplication operation.

In cases where the target frequency fT is sufficiently high, and the cutoff frequency of the analog low-pass filter is sufficiently low, the decimation filtering in the Step S2 and the downsampling in the Step S3 become unnecessary. For example, in cases where the target frequency fT is 250.3 Hz, the sampling frequency of the Modified Goertzel is set to 1501.8 Hz which is six times greater than the target frequency fT. Then, if a frequency component of 750.9 Hz or more in an input signal is sufficiently attenuated by the analog low-pass filter, it becomes possible to introduce the input signal directly sampled without involving the decimation filter, into the Modified Goertzel filter, so as to reduce a computational load.

Then, in Step S4, a processing using a limiter is performed. When a derivative of an envelope of an output signal becomes 0, it is determined that fI≠fT, based on the aforementioned first determination condition, irrespective of an amplitude of the input signal. However, the CTCSS tone squelch requires distinguishing between tone frequencies, for example, 67 Hz and 69.3 Hz in the most difficult situation, within 250 msec, as mentioned above. It is difficult to perform this operation based on only the first determination condition. For example, assuming that a tone signal mistuned from the target frequency fT by 2 Hz is input, a time from initialization of the Modified Goertzel filter through until the derivative of the envelope becomes 0 is estimated as 250 msec by the Formula 6.

Thus, in order to properly detect the tone signal with accuracy of 2 Hz or less within a shorter period of time than 250 msec, it is necessary to use the second determination condition in combination with the first determination condition. As a prerequisite to using the second determination condition, it is necessary that the amplitude a of the input signal in the Formulas 5 and 6, i.e., an input power, is known. However, a calculation of the input power leads to an increase in calculation cost. For avoiding this problem, in FIG. 1, the input signal is normalized. As the simplest means for the normalization, the limiter is used in the Step S4.

When the input signal is formed into a rectangular wave through the limiter, an odd-order harmonic component of the input signal appears in an output signal of the limiter. However, a power of an nth harmonic component has only a magnitude which is $1/n^2$ of a fundamental frequency component. Thus, even if a tone signal whose odd-order harmonic component has a frequency identical to the target frequency fT is input, a value of the envelope will not increase to become greater than the threshold value in the second determination condition within a given period of time, and thereby there is almost no possibility that the tone signal is erroneously detected. Differently, in cases where an input signal comprising a primary component consisting of a tone signal largely mistuned from the target frequency fT is input into the Modified Goertzel filter, a derivative of an envelope of an output signal will become 0 within a short period of time, according to the Formula 6. Thus, it is determined that fI≠fT based on the first determination condition. If an input signal comprising a tone signal having the target frequency fT and a tone signal having another frequency as a primary component is processed by the limiter, detection of a component at the target frequency fT is likely to become difficult. However, generally, in communication using the CTCSS tone between wireless communication units, a situation never occurs where two or more types of tone signals are simultaneously input. Thus, there is almost no possibility that the limiter-based processing causes a problem in the tone squelch determination algorithm.

Then, in Step S5, a processing based on the Modified Goertzel filter represented by the Formula 8 is performed. A resulting output q[k] has a waveform which oscillates at a frequency of $(\omega+\theta)/2$, as mentioned above. Then, in Step S6, a local maximum value (peak value) of the output signal q[k] is continuously held as an output value p[k] of an envelope detector until a next peak value is generated. As a result, a step-like envelope is obtained. In this process, it is possible to determine whether the output signal q[k] at a certain sampling point k is a maximum value, by simply comparing between the current output value q[k] and a preceding sampling values q[k−1], and between the current output value q[k] and a subsequent sampling values q[k+1].

Then, Step S7 is executed to obtain a derivative of the envelope based on a differentiator. Practically, the derivative is calculated, for example, by a difference processing, wherein an output value dp[k] thereof is derived as dp[k]=p[k]−p[k−1], by calculating a difference between successive input signal components. In cases where the tone signal having a frequency fI=fT is input, the output of the Modified Goertzel filter is repeatedly chopped to avoid overflow, according to a chopping trigger in after-mentioned Step S11, so that an envelope p[k] is changed in a sawtooth pattern. In this process, in order to avoid a situation where an output value of the differentiator becomes discontinuous before and after a sampling point where the chopping is performed, the differentiator in FIG. 1 is operable, when a chopping trigger is asserted, to perform scale-down of its input value using the same value as a scaling factor used during the aforementioned chopping in the Modified Goertzel filter, as described in the Step S5. When a peak value occurring just after the assertion and a peak value occurring just before the assertion are denoted as p[k] and p[k−1], respectively, while in the Formula 9, the scaling factor is set to 1/2, a differentiator program is configured to output dp[k], i.e. the derivative at the sampling point just after the assertion, according to the following Formula 17.

$$dp[k] = p[k] - \frac{p[k-1]}{2} \qquad (17)$$

In this manner, an approximately uniform derivative is continually obtained during input of the tone signal, while avoiding an influence of the chopping.

The envelope p[k] in the Step S6 changes in a step-like pattern, and thereby the output dp[k] of the differentiator in the Step S7 is formed as a continuous pulse train including zero values between the pulses. In Step S8, in order to convert the output dp[k] into a smoothly changing successive derivative while reducing an influence of noise, the output dp[k] is input into a low-pass filter, and a continuous derivative y[k] is output. This low-pass filter may be comprised of a first-order IIR filter having a simple coefficient represented by 2n. Therefore, the low-pass filtering processing can be achieved by several shifts and calculation consisting only of an addition operation and having a low computational load, without a need for performing a multiplication operation.

Subsequently, in Step S10, a current squelch state is examined. When the squelch is in a closed state, Step S12 is executed. In the Step S12, based on the first determination condition, an after-mentioned first determination section determines whether the continuous derivative y[k] is maintained to be equal to or greater than a certain first threshold value for a given period of time. Then, if YES, Step S13 is executed. In the Step S13, based on the second determination condition, it is determined whether a magnitude of the envelope is equal to or greater than a second threshold value. On the other hand, if the continuous derivative y[k] is not maintained above the first threshold, the squelch is maintained in the closed state in Step S14, and the Modified Goertzel filter is initialized to restart the tone detection process. As a result of the determination based on the second determination condition in the Step S13, if it is determined that the magnitude is equal to or greater than the second threshold value, the squelch is opened in Step S15. If the magnitude is less than the second threshold value, the Step S14 is executed to maintain the squelch in the closed state, and the Modified Goertzel filter is initialized to restart the tone detection process.

On the other hand, in the Step S10, if it is determined that the squelch is in an open state, Step S11 is executed. In the Step S11, an after-mentioned fourth determination section performs envelope chopping assertion determination. A determination condition in the fourth determination section is defined as whether the magnitude of the envelope is equal to or greater than a fourth threshold value, or whether a given time has elapsed after assertion of a previous chopping trigger. In the Step S11, if it is determined that the magnitude is equal to or greater than the fourth threshold value or the given time has elapsed, a chopping trigger is asserted to keep the filter output value q[k] from overflowing in the Modified Goertzel in the Step S5. Then, the process is shifted from the Step S11 to Step S16. In the Step S16, based on the third determination condition, an after-mentioned third determination section determines whether the continuous differential value y[k] drops to a certain third threshold value or less. If YES, i.e., it is determined that the tone signal is stopped, in Step S17, the squelch is closed in Step S17, and the Modified Goertzel filter is initialized to start a next tone detection process. On the other hand, in the Step S16, if it is determined that the continuous derivative y[k] is greater than the third threshold value, the squelch is maintained in the open state, in Step S18.

For example, the above tone squelch determination algorithm is executed by a tone signal circuit having the following configuration. For example, the tone signal circuit comprises: an analog low-pass filter operable to extract a frequency band including at least a tone signal component, from a demodulated signal in a receiver adapted to receive and demodulate a communication signal; an analog-to-digital converter operable to A/D convert an output of the analog low-pass filter from an analog value to digital value and output the digital value as a digital demodulated signal; a Goertzel filter operable to receive an input of the digital demodulated signal; an envelope detector operable to detect an envelope of an output of the Goertzel filter; a differentiator operable to derive a derivative of the envelope detected by the envelope detector; and a first determination section operable, when the derivative output from the differentiator is maintained to be equal to greater than a given first threshold value, to determine that a first prerequisite for existence of the tone signal component is satisfied. The tone signal circuit further comprises a second determination section operable, when a value of the envelope becomes greater than a given second threshold within a given period of time after the Goertzel filter is initialized, under a condition that an input amplitude of the digital demodulated signal is normalized to a specified value, to determine that a second prerequisite for existence of the tone signal component is satisfied. The tone signal circuit further comprises a third determination section operable, when the derivative drops to a given third threshold value or less, to determine that a tone signal is stopped, and initialize the Goertzel filter to start a next tone detection process.

The above description has been made by taking a tone squelch determination program as an example, on the assumption that the target frequency is set to 67 Hz, and the 8-bit MPU is used as an implementation platform. Alternatively, the first embodiment may be implemented as a program for any MPU other than the 8-bit MPU or a DSP, or a logic circuit using an FPGA, for any other target frequencies. Although being omitted for the sake of simplifying explanation, in cases where the DC value of the input signal x[k] is not 0, a high-pass filter may be inserted just after the sampling in FIG. 1.

Figure 3:
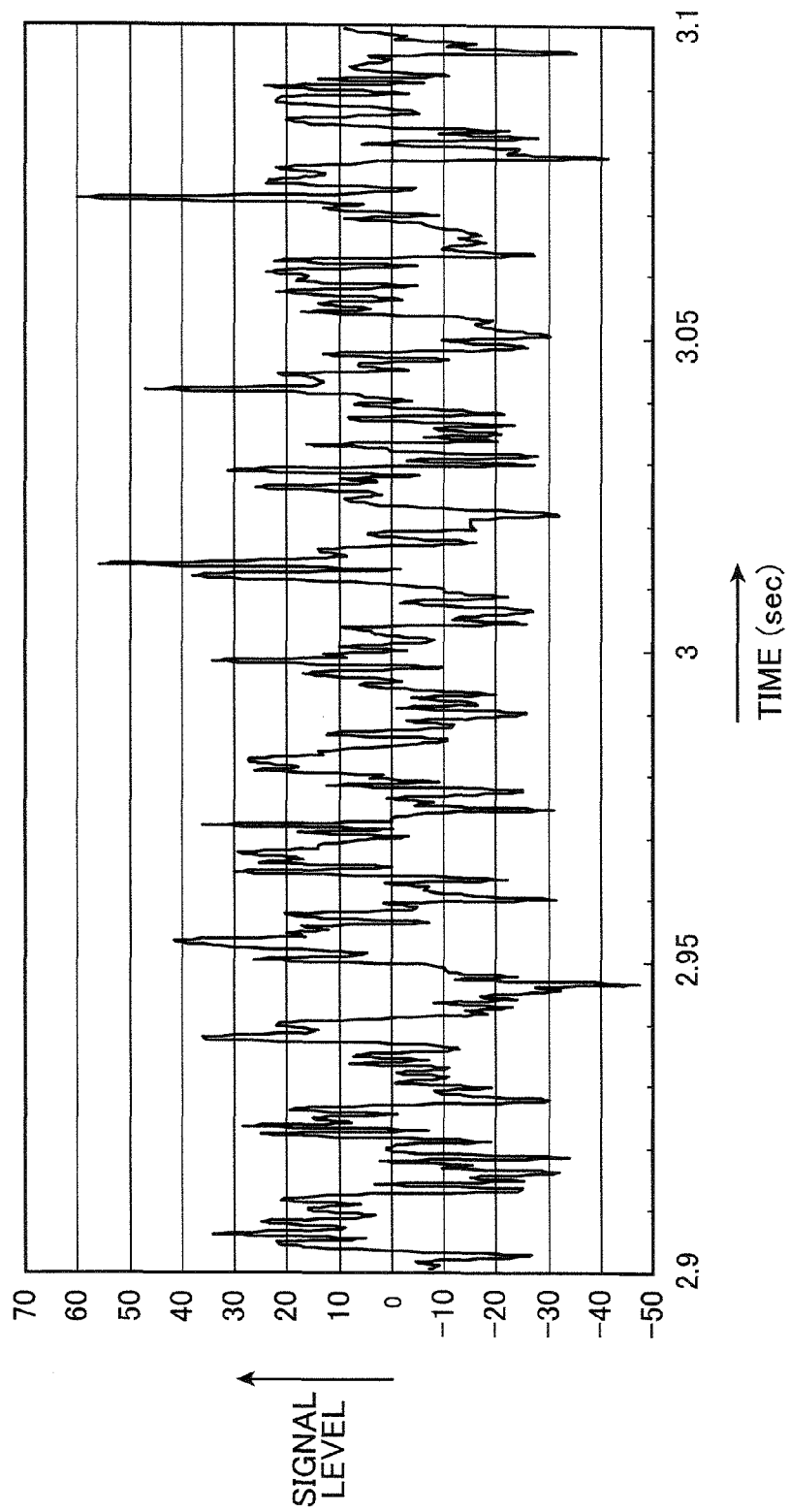
FIG. 3 is a graph illustrating a transient plot of a noise-contaminated input signal used in simulations illustrated in FIGS. 4 to 7.
Figure 4:
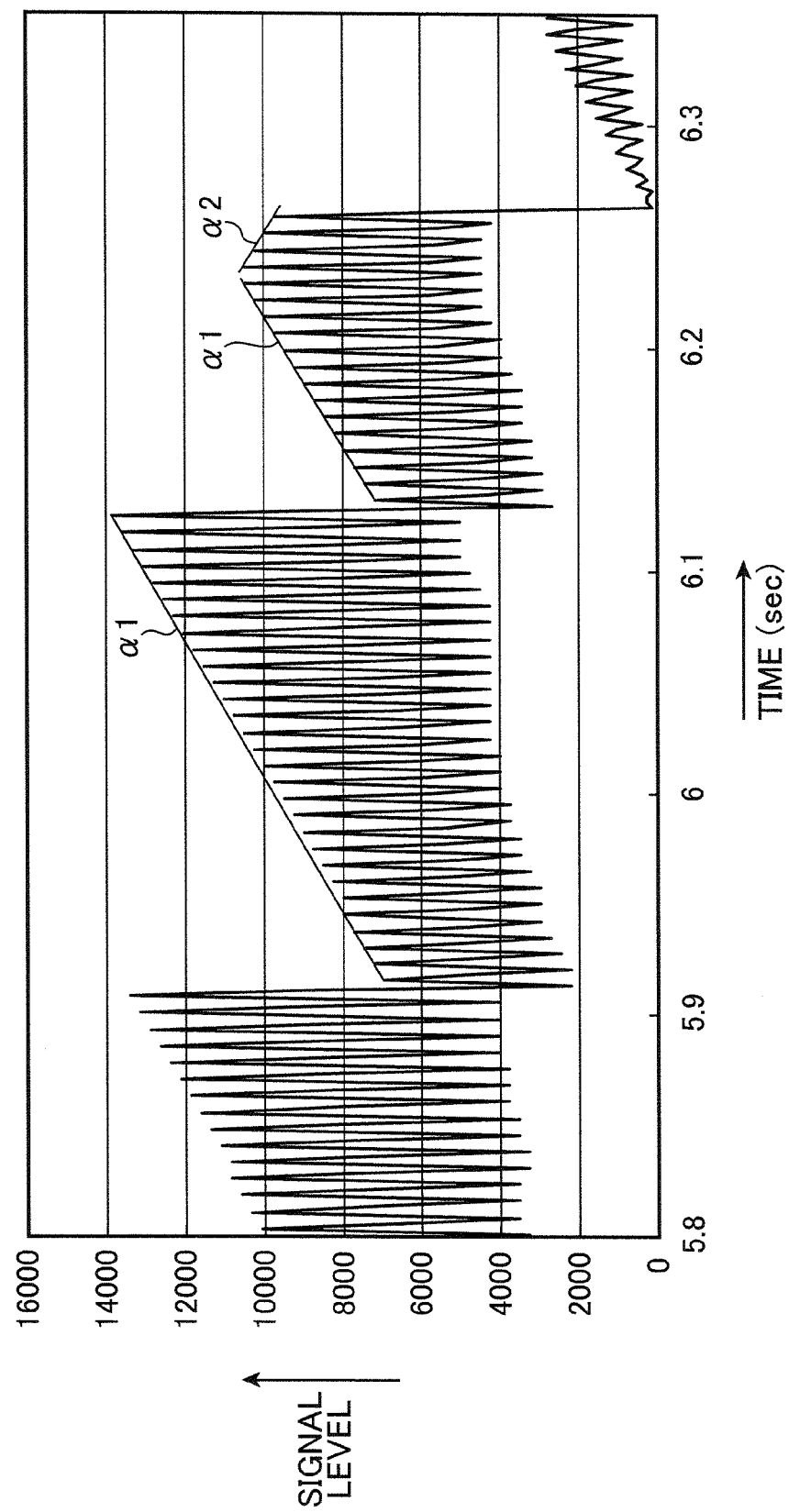
FIG. 4 is a graph illustrating a result of a simulation performed by the inventor using the tone squelch determination algorithm illustrated in FIG. 1, wherein a part of temporal changes in an output of the Modified Goertzel filter are plotted.

FIGS. 4 to 7 illustrate a result of a simulation performed by the inventor, wherein a program prepared by encoding the above tone squelch determination algorithm in the first embodiment is executed. In FIGS. 4 to 7, the abscissa represents time (sec), and the ordinate represents signal level. In the simulation, an input tone signal illustrated in FIG. 3 was used. In FIGS. 3 and 4, only a distinctive part of the entire period of the simulation is illustrated.

The input signal x[k] illustrated in FIG. 3 was obtained by digitizing a signal formed by adding white Gaussian noise to a sine wave having a constant amplitude and a frequency f1=67 Hz, as an 8-bit quantized discrete-time signal at a sampling frequency of 1608 Hz. In this example, the simulation was configured such that only a noise signal is introduced as an input signal until 0.25 sec elapses from start of the simulation, and then, until 6.23 sec elapses, the tone signal with noise as illustrated in FIG. 3 is input, whereafter, when 6.23 sec has elapsed, a tone stop signal obtained by delaying a phase of the tone signal by π, i.e. a tone termination signal, is input in a manner as described in the (i).

FIG. 4 is a graph prepared by plotting a part of temporal changes in an output signal q[k] of the 67 Hz Modified Goertzel filter (Step S5) in the first embodiment, with respect to the above input signal x[k]. As described in the (ii), in the output q[k] of the Modified Goertzel filter, any negative value is sign-inverted to a positive value. Thus, a peak-to-peak period of the output q[k] becomes one-half of a value calculated by the Formula 5, and the output q[k] seems as if it oscillates at a frequency 2 fT=134 Hz. Further, according to the Formula 5, a maximum value of the output q[k] continuously increases with an approximately constant positive slope.

An envelope of the output q[k] indicated by the reference code α1 in FIG. 4 changes in a sawtooth pattern, as mentioned above. Thus, the filtering processing by the Modified Goertzel filter can be continuously performed without overflow, even if the tone signal of the target frequency is continuously input for a long period of time. Then, as mentioned above, the phase of the input tone signal is delayed by π at a timing of elapse of about 6.23 sec. Thus, according to the Formula 16, the slope of the envelope of the output q[k] rapidly changes across a sampling point at the timing of about 6.23 sec from a positive sign to a negative sign, while maintaining an absolute value thereof constant, as indicated by the reference codes α1, α2.

The reason why the output value rapidly attenuates to approximately zero at a timing of elapse of 6.26 sec is that, in response to a change of a derivative dp[k] of the output envelope p[k] to 0 or less, the output value y[k] of the low-pass filter in FIG. 1 becomes equal to or less than the preset third threshold value at the timing, and thus the initializing trigger illustrated in FIG. 1 is transmitted to the Modified Goertzel filter in the Step S16, whereby each of the state variables q[k−1], q[k−2] held by the filter are initialized to 0.

Figure 5:
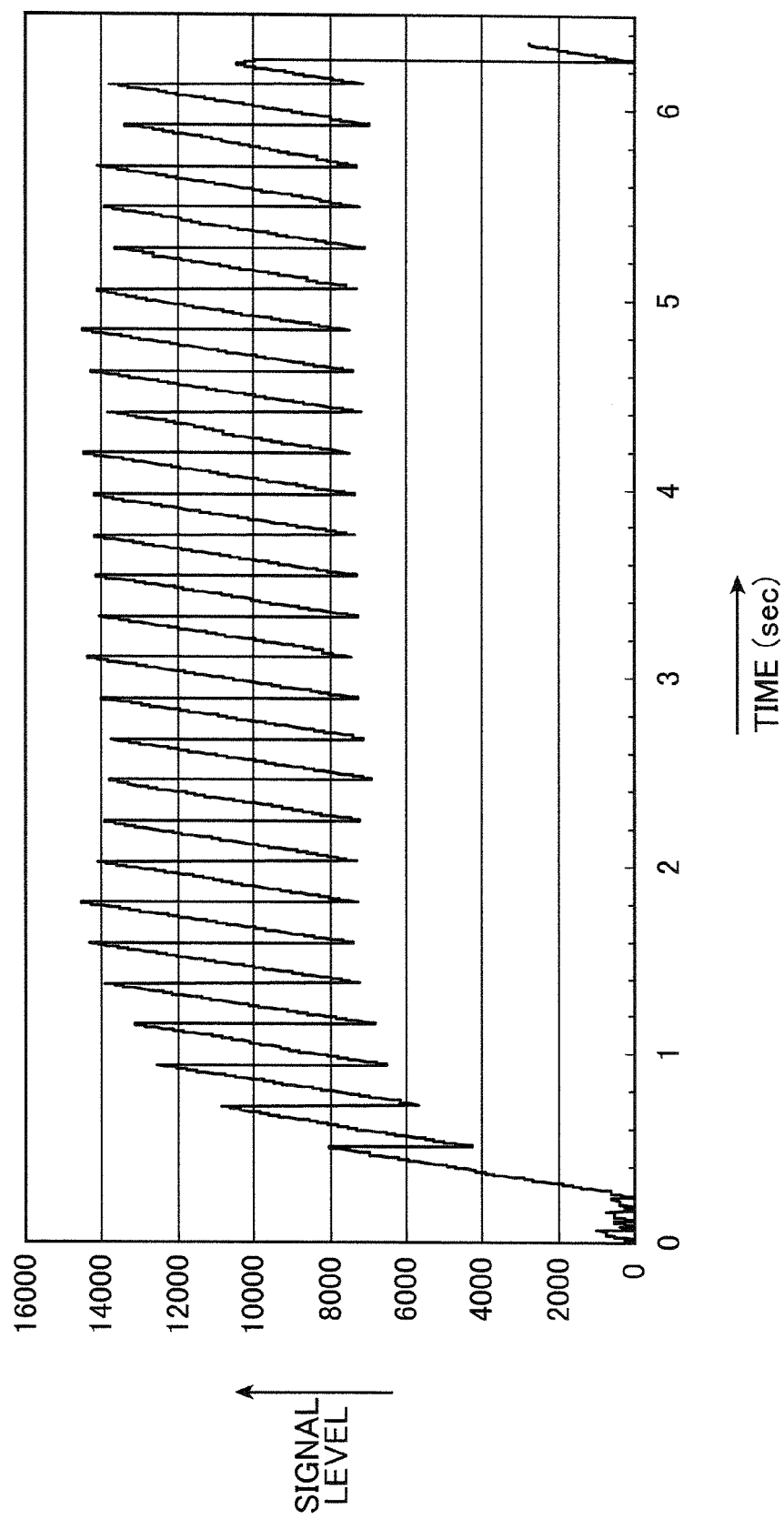
FIG. 5 is a graph illustrating a result obtained by subjecting the output signal of the Modified Goertzel filter to envelope detection, wherein an input tone frequency is coincident with a target frequency.

FIG. 5 is graph prepared by plotting temporal changes in an output signal p[k] of the envelope detector (Step S6) adapted to receive the above output of the in the Modified Goertzel filter. The envelope detector is operable to hold peak values of the output signal q[k] illustrated in FIG. 4, as mentioned above, so that an envelope p[k] changing in a sawtooth pattern is obtained as illustrated in FIG. 5. A magnitude of the envelope p[k] is proportional to a time-integral of a power spectral density at the target frequency fT in the input signal, during a period between the timing of initialization of the Modified Goertzel and the sampling point k, as mentioned above. Thus, in the period before the elapse of 0.25 sec, where only the noise signal is input, a situation where the derivative of the envelope becomes equal to or less than 0 at a sampling point frequently occurs, and the Modified Goertzel filter is initialized in each of the events, so that a value of the envelope is kept at a small value, and thereby the squelch is maintained in the closed state.

Then, when an input of the tone signal is started at the timing of elapse of 0.25 sec, the envelope starts rising according to the Formulas 5 and 6. If the output value of the envelope grows greater than the preset second threshold value (which is set to 8000, in this example) within a give period of time from a timing of last initialization of the Modified Goertzel filter, while the derivative of the envelope is maintained equal to or greater than the first threshold value for a given period of time, the first and second determination conditions are satisfied. Thus, the squelch is opened (S12-S13-S15). During a period where the squelch is in the open state, examination of the derivative of the envelope is continuously performed according to the third determination condition, and, as shown in FIG. 5, the chopping trigger is asserted periodically with a constant time intervals according to the fourth determination condition to control the envelope to avoid overflow. Then, as shown in FIG. 4, upon input of the tone termination signal, the derivative of the envelope changes to the third threshold value or less, and accordingly the squelch is closed (S10-S11-S16-S17). Although not illustrated in the simulation in this example, in cases where the tone signal is stopped according to the conditions (ii) and (iii) in the aforementioned manner, the derivative of the envelope changes to the third threshold value or less, so that the squelch can also be closed.

Figure 6:
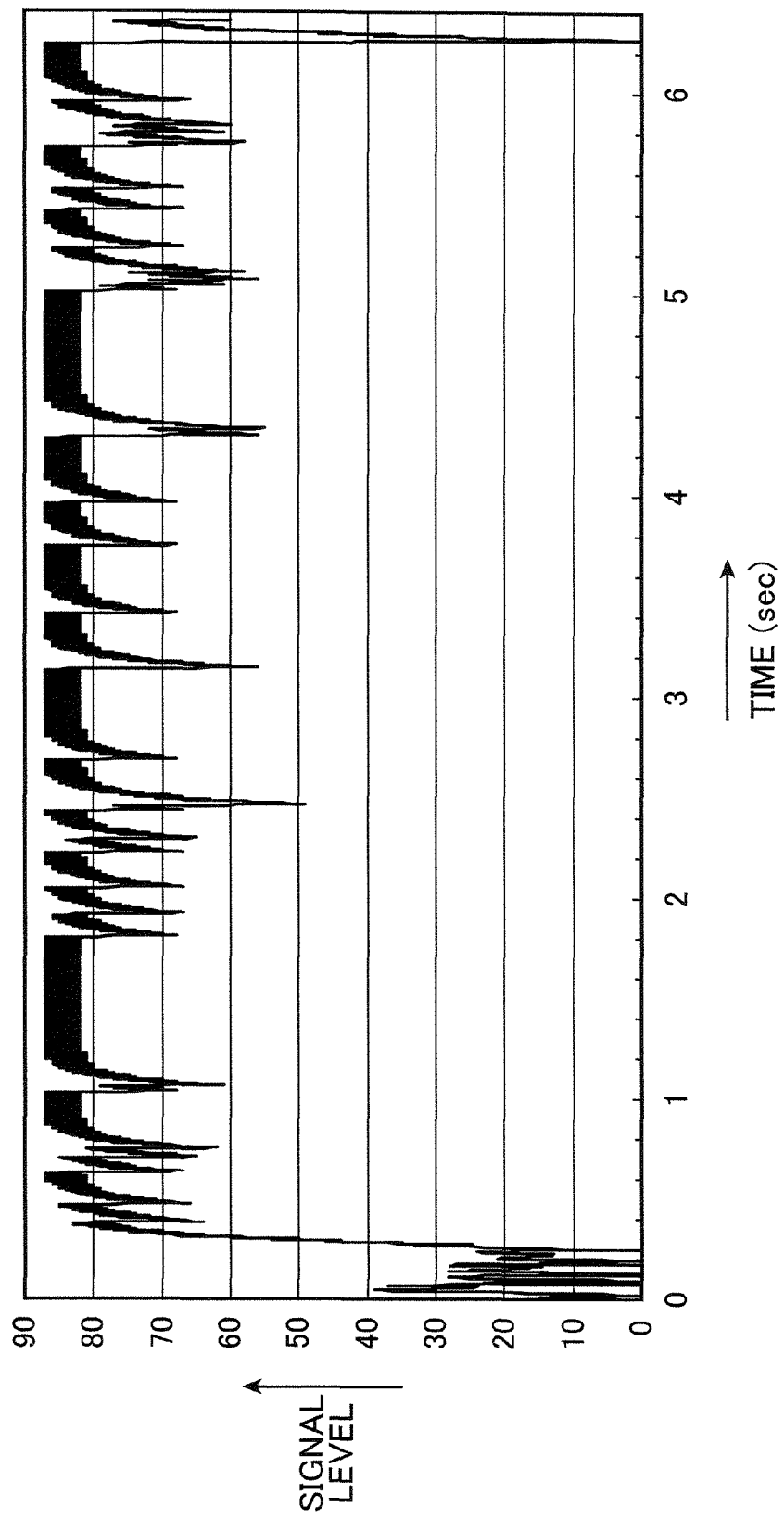
FIG. 6 is a graph illustrating a result obtained by subjecting the envelope signal to a differentiation processing and then a low-pass filtering processing.

FIG. 6 is graph prepared by plotting temporal changes in an output of the low-pass filter in the Step S9. The output value y[k] of the low-pass filter corresponds to a moving average of the derivative of the envelope illustrated in FIG. 5, as mentioned above. In the period before the elapse of 0.25 sec, where only the noise signal is input, a situation where the derivative of the envelope becomes equal to or less than 0 frequently occurs, and the initialization is performed accordingly, so that the output value y[k] of the low-pass filter is kept at a small value.

In contrast, in the subsequent period before the elapse of 6.23 sec, where the tone signal is input, the slope of the envelop becomes approximately constant according to the Formula 5, and thereby the output value y[k] of the low-pass filter is also kept at an approximately constant value of about 85. In FIG. 6, the output attenuates at uneven intervals in a spike pattern. This is because large noise is added to the input tone signal, not because of the chopping of the envelope. After the elapse of about 6.23 sec where the tone stop signal is input, the output value y[k] of the low-pass filter rapidly decreases to approximately 0, and, in response to detection of the decrease, the squelch is closed.

Figure 7:
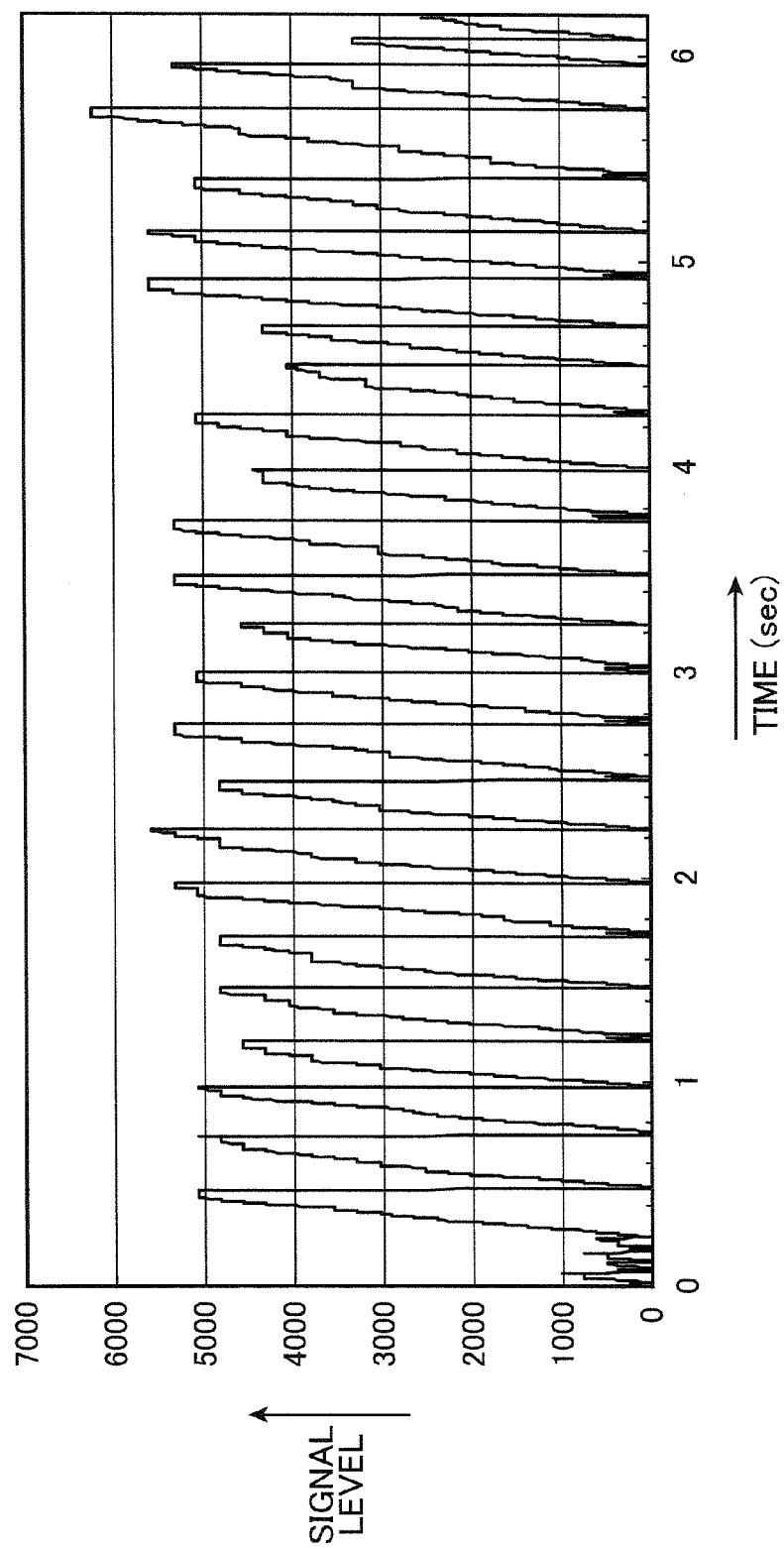
FIG. 7 is a graph illustrating a result obtained by subjecting the output signal of the Modified Goertzel filter to envelope detection, wherein an input tone frequency is deviated from a target frequency by 2 Hz.

FIG. 7 is a graph prepared by plotting temporal changes in the output signal p[k] of the envelope detector, with respect to a tone signal input having a frequency of 69 Hz mistuned by 2 Hz from the target frequency 67 Hz. As with FIG. 5, during a period from start of the simulation though until 0.25 sec elapses, only noise signal is introduced as an input signal. Then, a 69 Hz tone signal with noise is input.

As is clear from the Formula 6, in cases where a tone signal mistuned from the target frequency fT, the amplitude of the envelope becomes smaller in inverse proportion to the mistuned frequency deviation as compared to the cases where a tone signal coinciding with the target frequency fT as illustrated in FIG. 5, and an absolute value of the envelope will oscillate at the difference frequency. Thus, a magnitude and an increasing rate of the envelope become smaller than those in FIG. 5. In FIG. 7, the envelope cannot grow to a magnitude greater than the given second threshold vale (which is set to 8000, in this example) within a given period of time. As a result of satisfaction of the second determination condition, the initialization of the Modified Goertzel filter (S13-S14) is performed, and the value of the envelope p[k] also returns to 0. The above process will be repeated. In cases where a tone signal having a frequency of 65 Hz, the same output as that in FIG. 7 is obtained. Thus, even if a tone signal close to the target frequency with a spacing of ±2 Hz therebetween is input into a 67 Hz tone squelch determination program, the squelch determination is accurately performed without erroneously opening the squelch.

In the Goertzel algorithm of the second conventional technique, a finite-length input signal is introduced into a Goertzel filter, and a norm at a last one of a plurality of sampling points of a complex output signal, which corresponds to an amount of energy accumulated in the Goertzel filter during the span of the input signal, i.e. a power spectral density at the target frequency, is calculated to perform tone signal detection and ascertainment. In the first embodiment, as a new feature, the tone signal detection and ascertainment is performed by examining a derivative of an envelope of an output of a Modified Goertzel filter, so that it becomes possible to realize the tone signal detection and ascertainment only by performing an addition operation without a multiplication operation, at a low calculation cost and in a continuous manner.

Only an outline will be more specifically described. In the second conventional technique, in order to derive (norm of) a filter output in the Formula 1, it is necessary to perform calculation using the Formula 2, N times, and calculation of the numerator of G(z) in the Formula 1, and further perform calculation of a magnitude (square of a real part+square of an imaginary part) of an output value (complex number) of G(z) in the Formula 1, which gives rise to a need for performing a multiplication operation about N+3 times. If N is increased to handle an infinite-length input signal, overflow will occur. In contrast, as is clear from FIG. 1, in the first embodiment, any section, except the Modified Goertzel filter (Step S5), requires no multiplication operation. In this respect, the first embodiment is effective.

In the first embodiment, using a relative low sampling frequency which is six times or three times greater than the target frequency fT, high-frequency-resolution tone squelch determination can be performed within a short period of time after start of input of a tone signal. In cases where the third conventional technique is used under the same conditions, it generally becomes difficult to perform tone squelch determination with frequency resolution and noise immunity satisfying required specifications. In the tone squelch determination algorithm in the first embodiment illustrated in FIG. 1, it becomes possible to, with respect to an 8-bit fixed-point input signal, realize determination on whether an input signal frequency fI coincides with the target frequency fT, with sufficient accuracy, only by a low-computational-load arithmetic processing without using a multiplication operation. Thus, in the tone squelch determination algorithm in the first embodiment, the tone squelch determination can be performed at a high speed with a high degree of accuracy, even using a commonly-used 8-bit MPU having no multiplier, i.e., low computational performance, so that it becomes possible to implement tone squelch function with lower power consumption at a lower cost than ever before, irrespective of input signal levels.

The tone squelch determination algorithm in the first embodiment may be implemented with an FPGA as a small-scale logic circuit. Thus, the tone squelch determination algorithm in the first embodiment is effective in facilitating extension of a battery run time and reduction in cost, in a mobile wireless receiver.

Due to the progress toward lower price and lower power consumption in higher-bit MPUs, there may seem to be no significant difference in cost and power consumption as a package between an 8-bit MPU and e.g., a 32-bit MPU. However, for example, comparing between them under a condition that the same semiconductor process, e.g. a 28 nm CMOS technology, as in the above FPGA, is used for manufacturing, the 8-bit MPU can be always implemented at a low cost and operated with low power consumption, as compared to the 32-bit MPU.

(Second Embodiment)

FIG. 8 is a flowchart illustrating a determination algorithm in a tone squelch determination circuit according to a second embodiment of the present invention. In the algorithm illustrated in FIG. 8, a step similar to or corresponding to that of the algorithm in FIG. 1 is defined by the same step number, and its description will be omitted. In the algorithm in the second embodiment, a sampling frequency $f_S$ in Step S1$a$ can be set to an arbitrary value. Specifically, this algorithm is suitably usable in a situation where it is difficult to set a sampling frequency to be a value which is six times or three times greater than the target frequency due to presence of restrictions on setting values of the sampling frequency, or a situation where it is permitted to increase power consumption or calculation time due to an 8-bit multiplication operation.

The second embodiment is advantageous in allowing an arbitrary value to be assigned to the sampling frequency $f_S$. On the other hand, the filter coefficient "cos θ" of the Goertzel filter represented by the Formula 1 is calculated as a non-rational number value. Thus, the coefficient C1 of the buffer 4 in the Modified Goertzel filter illustrated in FIG. 2 is also calculated as a value other than 1. Thus, in order to derive the output value of the Modified Goertzel filter, it becomes necessary to perform an 8-bit multiplication operation once. Moreover, due to this filter operation, quantization noise will be added to the output signal. Thus, noise immunity in the tone squelch determination becomes poor as compared with the first embodiment. In the second embodiment, it is preferable to adjust the sampling frequency $f_S$ and the number N of sampling points to allow $Nf_T/f_S$ to become a value maximally close to an integer value.

In the second embodiment, a sampling frequency of an input signal x[k] coincides with the sampling frequency $f_S$ of the Modified Goertzel filter. Thus, differently from the first embodiment in FIG. 1, there is no need to perform the down-sampling (Step S3), and the Decimation filter (Step S2) can be omitted. Specifically, in the second embodiment, after a demodulated signal is subjected to an analog low-pass filtering processing, the filtered signal is A/D converted at the sampling frequency $f_S$ set to an arbitrary value, and the Step S4 is executed. Subsequently, the same process as that in the first embodiment will be executed.

However, this means that all of the blocks from the Modified Goertzel filter input x[k] to the squelch determination output q[k] in FIG. 2 are driven by a high clock frequency equal to the sampling frequency of the input signal x[k]. Thus, in the second embodiment, each of the computational cost and the power consumption will increase as compared to the first embodiment. It is understood that the algorithm in the second embodiment is capable of perform the tone detection in a smaller calculation amount with a higher degree of accuracy than the conventional techniques.

The algorithm in the second embodiment may be applied to a DTMF detector or the like, as well as analog wireless communication units. In this case, it is necessary to perform simultaneous detection of two or more types of tones. Thus, the limiter (Step S4) is removed, and a plurality of Modified Goertzel filters may be employed.

The specification discloses the aforementioned arrangements. The following is a summary of the primary arrangement of the embodiments.

According one aspect, there is a provided a tone signal circuit for, after extracting a signal of low frequency band which covers a set of tone frequencies from a demodulated signal in a receiver, through an analog low-pass filter and A/D converting the extracted signal of low-frequency band into a digital demodulated signal, performing a digital signal processing using the digital demodulated signal as an input signal to determine the presence or absence of a tone signal component having a desired frequency. The tone signal circuit comprises: a Goertzel filter operable to receive the digital demodulated signal; an envelope detector operable to detect an envelope of an output of the Goertzel filter; a differentiator operable to derive a derivative of the envelope detected by the envelope detector; and a first determination section operable, when the derivative output from the differentiator is maintained to be equal to or greater than a given first threshold value, to determine that a first prerequisite for existence of the tone signal component with a significant magnitude is satisfied.

In a conventional technique, a finite-length input signal is introduced into the Goertzel filter, and a norm at a last one of a plurality of sampling points in a complex output signal is calculated to perform tone signal detection and ascertainment. Differently, in the above tone signal circuit, the derivative of the envelope of the output of the Goertzel filter is examined, and, when the derivative is maintained to be equal to or greater than the given first threshold value, to determine that the tone signal component continuously exists. Then, if the squelch is in a closed state, the squelch is opened according to the determination result.

Thus, in the above tone signal circuit, a multiplication operation is not required for calculation of the envelope and the derivative, so that the tone signal detection/ascertainment can be realized only by an addition operation without a multiplication operation and performed at a low calculation cost. In addition, the derivative can be continuously derived, so that the above tone signal circuit can increase a squelch response speed.

Preferably, the above tone signal circuit further comprises a second determination section which is operable, when a value of the envelope becomes greater than a given second threshold within a given period of time after the Goertzel filter is initialized, under a condition that an input amplitude of the digital demodulated signal is normalized to a known value, to determine that a second prerequisite for existence of the tone signal component is satisfied.

Even if an input amplitude of the digital demodulated signal is unknown, the tone signal circuit having the above feature can perform the tone signal detection within a shorter period of time, as compared to determination based on only the derivative of the envelope. Specifically, in the determination based on the derivative, it is difficult to discriminate a tone close to the target frequency with a spacing of 2 Hz or less therebetween, within 250 msec. Thus, the determination using a magnitude of the envelope is required. If calculation for an input power is performed to determine a threshold value necessary for the determination, a computational load will be increased. Thus, in the above tone signal circuit, based on normalizing an input amplitude to a known value, the presence or absence of the tone signal component can be determined simply by comparing a magnitude of the amplitude with the preset second threshold value. Then, if the squelch is in the closed state, the squelch is adequately opened according to the determination result.

In the above tone signal circuit, in the operation of normalizing the amplitude of the input signal, it is preferable to use a limiter for binary quantization of the digital demodulated signal to be input into the Goertzel filter.

In the tone signal circuit having this feature, when the input signal is formed into a rectangular wave through the limiter, an odd-order harmonic component of the input signal appears in an output signal of the limiter. However, a power spectral density of an nth harmonic component has only a magnitude which is $1/n^2$ of a fundamental frequency component. Thus, even if a tone signal whose odd-order harmonic component has a frequency identical to the target frequency $f_T$ is input, energy to be accumulated within a given period of time in a Goertzel filter, corresponding to the target frequency $f_T$, is limited to a small value, so that a value of the envelope will not increase to become greater than the second threshold value and thereby there is almost no possibility that the tone signal is erroneously detected. If an input signal comprising a tone signal having the target frequency $f_T$ and a tone signal having another frequency is processed by the limiter, detection of a component at the target frequency $f_T$ is likely to become difficult. However, in the CTCSS tone squelch, the number of tone signals to be used in one radio channel is one. Thus, such a problem will never occur.

Preferably, the above tone signal circuit further comprises a third determination section operable, when the derivative drops to a given third threshold value or less, to determine that a tone signal is stopped, and initialize the Goertzel filter to start a next tone detection process.

The tone signal circuit having this feature can perform tone stop determination.

Preferably, in the above tone signal circuit, a sampling frequency of the Goertzel filter is three times or six times greater than a frequency of a tone signal to be detected.

According to this feature, the Goertzel filter can have a simple transfer function having an integer coefficient, so that the tone signal circuit having this feature can calculate an output value only by an addition operation without a need for a multiplication operation. This makes it possible to execute a filtering processing accurately at a high speed with low power consumption.

Preferably, in the above tone signal circuit, the Goertzel filter is operable to perform scaling for an internal state variable at a timing designated by a chopping trigger input.

According to this feature, when chopping trigger is asserted to avoid overflow to be caused by input of a tone signal for a long period of time, the output value is scaled down at a ratio equal to the scaling factor for state variable.

Thus, in the tone signal circuit having this feature, the observation of the envelope of the output can be performed without the occurrence of overflow, by asserting the chopping trigger at an appropriate timing. In order to execute the chopping/scaling and output rectification via sign inversion for coefficients including the state variable, the conventional Goertzel filter is modified. Thus, the Goertzel filter in the present invention is referred to as "Modified Goertzel filter", as mentioned above.

Preferably, in the above tone signal circuit, the A/D conversion is performed at a frequency N (N>2) times greater than the sampling frequency of the Modified Goertzel filter for the input signal, and the input signal is subjected to 1/N downsampling and then introduced into the Modified Goertzel filter. Further, in order to avoid aliasing to be caused by the downsampling, a decimation filter comprised of a low-order FIR filter having a small number of notches in frequency characteristics may be used.

Even if a position of the notch in the frequency characteristics of the decimation filter do not accurately coincide with a frequency causing aliasing with respect to the target frequency $f_T$, a sufficient anti-aliasing effect can be obtained. Thus, generally, the decimation filter may be comprised of a FIR filter having a small number of coefficients equal to a power of two, and is capable of performing a filtering processing only by few addition operations and shift operations without a multiplication operation.

Preferably, the above tone signal circuit further comprises a buffer provided in an input stage of the Goertzel filter, wherein the buffer is operable to perform sign inversion for the digital demodulated signal and a filter state variable, so as to allow a filter output of the Goertzel filter to constantly have a non-negative value.

In the tone signal circuit having this feature, an interval of maximum peaks of a filter output is narrowed by ½, so that it becomes possible to reduce quantization noise in the differential value of the envelope.

According to another aspect of the present invention, there is provided a wireless receiver which comprises the above tone signal circuit, wherein the tone signal circuit is used for tone squelch. In the above wireless receiver, detection/ascertainment of start and stop of a tone signal can be realized only by an addition operation without a multiplication operation, and performed at a low calculation cost and at a high speed. This is particularly effective in lowering power consumption, simplifying circuit configuration and reducing cost.

This application is based on Japanese Patent Application Serial No. 2010-234614, filed in Japan Patent Office on Oct. 19, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A tone signal circuit comprising:
   an analog low-pass filter operable to extract a frequency band including at least a tone signal component, from a demodulated signal in a receiver adapted to receive and demodulate a communication signal;
   an analog-to-digital converter operable to A/D convert an output of the analog low-pass filter from an analog value to digital value and output the digital value as a digital demodulated signal;
   a Modified Goertzel filter in which a Goertzel filter is modified so that a numerator of transfer function is 1, and that operable to receive an input of the digital demodulated signal;
   an envelope detector operable to detect an envelope of an output of the Modified Goertzel filter;
   a differentiator operable to derive a derivative value of the envelope detected by the envelope detector; and
   a first determination section operable, when the derivative value output from the differentiator is maintained to be equal to or greater than a given first threshold value, to determine that a first prerequisite for existence of the tone signal component is satisfied.

2. The tone signal circuit as defined in claim 1, which further comprises a second determination section operable, when a value of the envelope becomes greater than a given second threshold within a given period of time after the Modified Goertzel filter is initialized, under a condition that an input amplitude of the digital demodulated signal is normalized to a known value, to determine that a second prerequisite for existence of the tone signal component is satisfied.

3. The tone signal circuit as defined in claim 2, which further comprises a limiter operable to normalize the digital demodulated signal to be input into the Modified Goertzel filter.

4. The tone signal circuit as defined in claim 1, which further comprises a third determination section operable, when the derivative value drops to a given third threshold value or less, to determine that a tone signal is stopped, and initialize the Modified Goertzel filter to start a next tone detection process.

5. The tone signal circuit as defined in claim 1, wherein a sampling frequency of the Modified Goertzel filter is three times or six times greater than a frequency of a tone signal to be detected.

6. The tone signal circuit as defined in claim 5, wherein the Modified Goertzel filter is operable to perform output scaling at a given timing.

7. The tone signal circuit as defined in claim 5, which further comprises: a downsampling circuit operable to perform downsampling in advance of inputting to the Modified Goertzel filter; and a decimation filter comprised of a low-order FIR filter having a notch and designed to avoid aliasing to be caused by the downsampling, wherein the analog-digital converter is adapted to perform the A/D conversion at a sampling frequency different from the sampling frequency of the Modified Goertzel filter.

8. The tone signal circuit as defined in claim 1, which further comprises a buffer provided in an input stage of the Modified Goertzel filter, the buffer being operable to perform sign inversion for the digital demodulated signal and a filter state variable of the Modified Goertzel filter, so as to allow a filter output of the Modified Goertzel filter to constantly have a non-negative value.

9. A wireless receiver comprising the tone signal circuit as defined in claim 1, wherein the tone signal circuit is used for tone squelch.

* * * * *